US012168966B2

(12) United States Patent
Richards et al.

(10) Patent No.: US 12,168,966 B2
(45) Date of Patent: Dec. 17, 2024

(54) MODULAR AND SCALABLE RAIL FUEL SYSTEM ARCHITECTURE

(71) Applicant: CUMMINS INC., Columbus, IN (US)

(72) Inventors: Kieran J. Richards, West Haddon (GB); Brandon Glover, Coventry (GB); Vincent Denoyelle, Daventry (GB); Jacques L. Vincent, Rugby (GB); Raghuvaran Arumugam, Daventry (GB); Satya Dinakar Vyseetty, Daventry (GB); Joseph A. Worthington, Scipio, IN (US); Abhishek Mehrotra, Columbus, IN (US); Deepak Pillai, Seymour, IN (US); Todd S. Manley, Franklin, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/513,499

(22) Filed: Nov. 17, 2023

(65) Prior Publication Data

US 2024/0084769 A1 Mar. 14, 2024

Related U.S. Application Data

(63) Continuation of application No. 17/630,990, filed as application No. PCT/US2020/044035 on Jul. 29, 2020, now Pat. No. 11,821,397.

(Continued)

(51) Int. Cl.

| | |
|---|---|
| ***F02M 63/02*** | (2006.01) |
| ***F02M 55/00*** | (2006.01) |
| ***F02M 55/02*** | (2006.01) |

(52) U.S. Cl.

CPC ...... *F02M 63/0225* (2013.01); *F02M 55/002* (2013.01); *F02M 55/02* (2013.01); *F02M 55/025* (2013.01); *F02M 63/0285* (2013.01)

(58) Field of Classification Search

CPC .. F02M 63/0225; F02M 55/002; F02M 55/02; F02M 55/025; F02M 63/0285

(Continued)

(56) References Cited

U.S. PATENT DOCUMENTS

| | | | |
|---|---|---|---|
| 2,988,077 A | 6/1961 | Hottenroth | |
| 4,445,713 A | 5/1984 | Bruning | |

(Continued)

FOREIGN PATENT DOCUMENTS

| | | | |
|---|---|---|---|
| CN | 104033563 A * | 9/2014 | ........... F02M 59/445 |
| DE | 10104634 A1 | 9/2002 | |

(Continued)

OTHER PUBLICATIONS

DE-102004060003-A1 (Schrott et al.) (Jul. 6, 2006) (Machine Translation) (Year: 2006).*

(Continued)

*Primary Examiner* — Mahmoud Gimie
(74) *Attorney, Agent, or Firm* — Foley & Lardner LLP

(57) ABSTRACT

A connector block that directs fuel from an outer fuel line to an inner fuel line. The connector block includes an inlet that couples to the outer fuel line, an outlet that coupled to the inner fuel line, and a fuel accumulator fluidly coupled to the inlet and the outlet. The fuel accumulator directs the fuel from the inlet to the outlet.

20 Claims, 12 Drawing Sheets

Related U.S. Application Data

(60) Provisional application No. 62/880,957, filed on Jul. 31, 2019.

(58) Field of Classification Search
USPC ........................................................ 123/52.1
See application file for complete search history.

(56) References Cited

U.S. PATENT DOCUMENTS

| | | | | |
|---|---|---|---|---|
| 5,950,602 | A | 9/1999 | Shinohara | |
| 6,237,571 | B1 | 5/2001 | Harrison | |
| 6,827,065 | B2 | 12/2004 | Gottemoller et al. | |
| 7,047,942 | B2 | 5/2006 | Ando et al. | |
| 7,377,263 | B2 | 5/2008 | Muench et al. | |
| 7,721,715 | B2 | 5/2010 | Sakagami et al. | |
| 7,802,558 | B2 | 9/2010 | Panchal | |
| 8,752,527 | B2 | 6/2014 | Worthington et al. | |
| 8,844,500 | B2 | 9/2014 | Bedekar et al. | |
| 9,506,436 | B2 | 11/2016 | Voutilainen | |
| 9,593,655 | B2 | 3/2017 | McCune et al. | |
| 11,821,397 | B2 * | 11/2023 | Richards | F02M 63/0285 |
| 2003/0070658 | A1 * | 4/2003 | Warner | F02M 51/005 123/456 |
| 2003/0094158 | A1 * | 5/2003 | Maier | F02D 19/0657 123/456 |
| 2004/0194761 | A1 | 10/2004 | Ando et al. | |
| 2014/0261330 | A1 * | 9/2014 | Doherty | F02M 63/0275 123/456 |
| 2014/0283790 | A1 | 9/2014 | Suzuki et al. | |
| 2014/0299102 | A1 | 10/2014 | McCune et al. | |
| 2015/0107558 | A1 | 4/2015 | Dugad et al. | |
| 2016/0177901 | A1 | 6/2016 | Dicken et al. | |
| 2016/0341166 | A1 | 11/2016 | Martin et al. | |

FOREIGN PATENT DOCUMENTS

| | | | | |
|---|---|---|---|---|
| DE | 102004060003 | A1 * | 7/2006 | F02M 55/025 |
| DE | 20 2008 004 86 | A | 12/2008 | |
| DE | 202008004864 | U1 * | 12/2008 | F02M 55/02 |
| DE | 102011056118 | A1 * | 6/2013 | F02M 55/025 |
| DE | 10 2018 104 848 | B3 | 3/2018 | |
| DE | 102016221457 | A1 * | 5/2018 | |
| JP | 19-98073063 | | 3/1998 | |

OTHER PUBLICATIONS

DE-102016221457-A1 (Kolb et al.) (May 3, 2018) (Machine Translation) (Year: 2018).*

Foreign Search Report for EP Application No. 20847476.7, dated May 17, 2023.

International Search Report and Written Opinion for PCT Application No. PCT/US2020/044035, dated Oct. 15, 2020.

Non-Final Office Action on U.S. Appl. No. 17/630,990 DTD Mar. 31, 2023.

Notice of Allowance on U.S. Appl. No. 17/630,990 DTD Jul. 13, 2023.

Office Action for CN Application No. 202080054159.5, dated Apr. 21, 2023.

Office Action for IN Application No. 202247003354, dated Apr. 22, 2022.

* cited by examiner

MODULAR AND SCALABLE RAIL FUEL SYSTEM ARCHITECTURE

CROSS-REFERENCE TO RELATED APPLICATIONS

The present application is a continuation of U.S. patent application Ser. No. 17/630,990, filed Jul. 29, 2020, which is the U.S. National Stage of PCT Application No. PCT/US2020/044035, filed Jul. 29, 2020, which claims priority to U.S. Provisional Patent Application No. 62/880,957, filed Jul. 31, 2019, the contents of which are incorporated herein by reference in their entirety.

TECHNICAL FIELD

The present invention relates generally to systems for injecting fuel into an internal combustion engine.

BACKGROUND

In an internal combustion engine, fuel is provided to the engine via a fuel injection system. The fuel injection system directs fuel housed in a fuel pump through injector lines that are coupled to fuel injectors. The fuel injectors are coupled, either directly or indirectly, to cylinders in the engine. The fuel is mixed with air (either in the cylinder our outside of the cylinder), and is ignited within the cylinder to power the engine. Internal combustion engines are offered in a variety of different sizes and can vary in the arrangement of the cylinders (e.g., an inline arrangement or a v-arrangement) and the number of cylinders in the arrangement. The various arrangements in which cylinders can be arranged may require different injector line designs to accommodate the arrangements.

SUMMARY

In one set of embodiments, an engine system includes a plurality of fuel injectors configured to direct fuel to a plurality of cylinders. A modular system for injecting fuel into the engine system comprises a fuel rail. A plurality of connection members are coupled to the fuel rail, and each of the plurality of connection members is configured to receive fuel from the fuel rail. The fuel is directed to the plurality of fuel injectors. A plurality of outer fuel lines are coupled to the plurality of connection members, and the plurality of outer fuel lines are arranged in a single configuration. The single configuration allows the fuel rail to be coupled to a plurality of engine configurations while maintaining the plurality of outer fuel lines arranged in the single configuration.

In another set of embodiments, an engine system, includes a plurality of fuel injectors configured to direct fuel to a plurality of cylinders, a fuel rail, and a plurality of connection members. Each of the plurality of connection members is configured to receive fuel from the fuel rail and direct fuel to the plurality of fuel injectors. A plurality of outer fuel lines are coupled to the plurality of connection members and are arranged in a first configuration that allows the fuel rail to be coupled to a plurality of engine configurations while maintaining the plurality of outer fuel lines arranged in the first configuration. A plurality of connector blocks are coupled to the plurality of outer fuel lines and are configured to direct fuel from the plurality of outer fuel lines to a plurality of inner fuel lines.

In yet another set of embodiments, an engine system comprises a plurality of fuel injectors configured to direct fuel to a plurality of cylinders. A modular system for injecting fuel into the engine system includes a first fuel rail and a second fuel rail. A conduit fluidly coupled to the first fuel rail and the second fuel rail is configured to provide fuel to the first fuel rail and the second fuel rail in parallel. Each of a plurality of connection members is configured to receive fuel from the first fuel rail or the second fuel rail and direct fuel to the plurality of fuel injectors. A plurality of outer fuel lines are coupled to the plurality of connection members and are arranged in a single configuration. The single configuration allows the first fuel rail and the second fuel rail to be coupled to a plurality of engine configurations while maintaining the plurality of outer fuel lines arranged in the single configuration.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Following below are more detailed descriptions of various concepts related to, and implementations of, methods, apparatuses, and systems for directing fuel to a fuel injector of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

In an internal combustion engine, fuel is provided to the engine via a fuel injection system. The fuel is mixed with air (either in the cylinder our outside of the cylinder), and is ignited within the cylinder to power the engine. Internal combustion engines are offered in a variety of different sizes and can vary in the arrangement of the cylinders (e.g., an inline arrangement or a v-arrangement) and the number of cylinders in the arrangement. The various arrangements in which cylinders can be arranged may require different injector line designs to accommodate the arrangements.

Implementations herein relate to a system to provide fuel to an engine that includes a modular fuel rail coupled to an intake manifold or other suitable location. An outer fuel line can connect the fuel rail to a connector block that is coupled to a rocker housing. In various embodiments, the outer fuel line can comprise either a double wall or a single wall design. The connector block provides a pathway for the fuel to travel from the outer fuel line to an inner fuel line under the valve cover. The inner fuel line is comprised of multiple walls to provide for fuel leakage to be routed back to the connector block and away from the valve cover.

The various embodiments of the system described herein provide benefits that can be applied to internal combustion engines in both inline configurations and v-configurations. The modular system allows the fuel rail to be integrated on to existing engines. The multiple wall design can reduce the risk of fuel spray from an injector connection when the connection is on the hot side of the engine. Leaking fuel at the cold side connection routes the fuel away from hot components and reduces the risk of the leaking fuel contacting hot areas. The leaking fuel can either be vented in a controlled manner or collected. Various embodiments of the system can reduce both the total cost of ownership and engine repair time.

Figure 1:
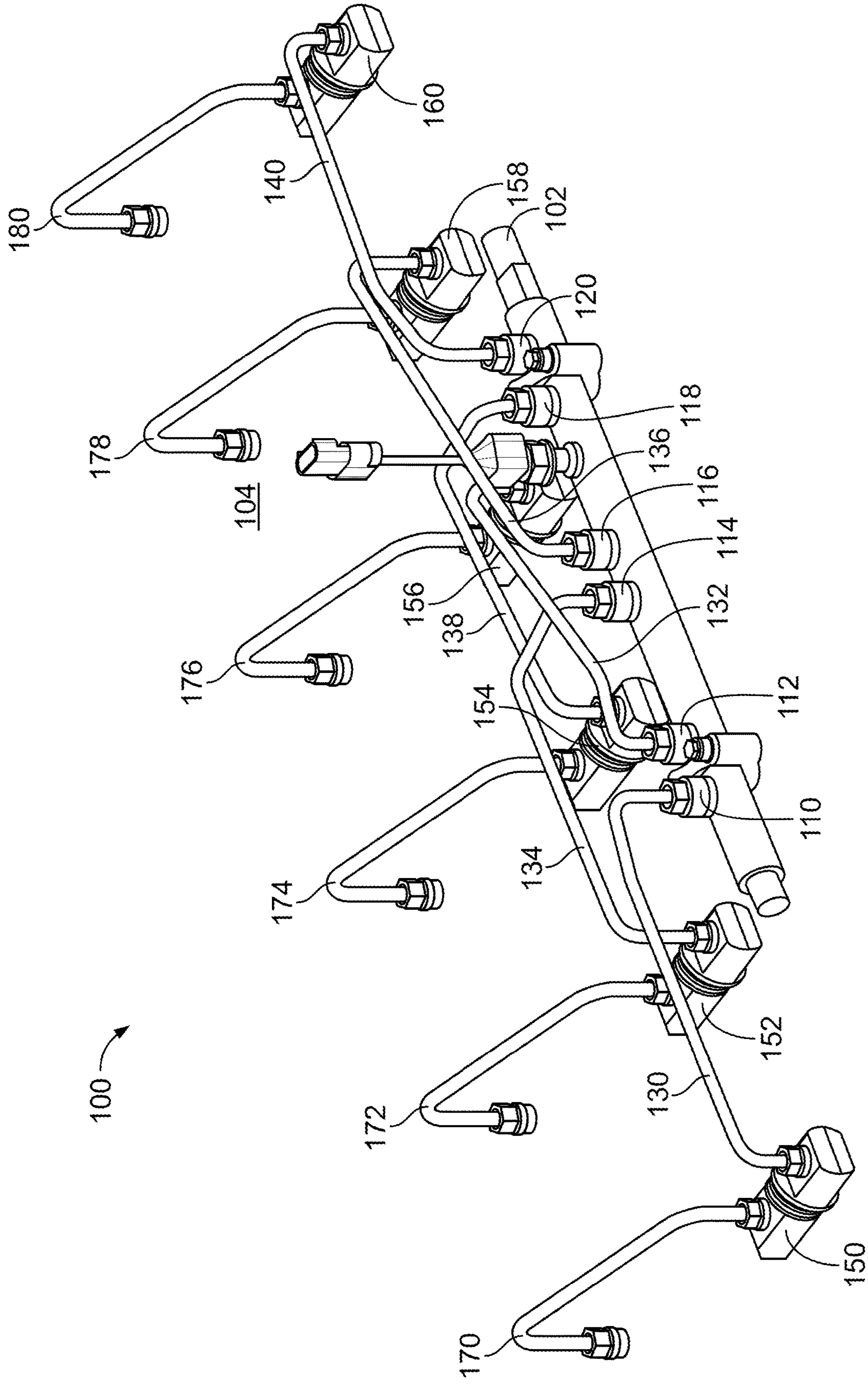
FIG. 1 is an illustration of a fuel distribution system, according to a particular embodiment.

FIG. 1 is an illustration of a fuel distribution system 100, according to a particular embodiment. The fuel distribution system 100 of FIG. 1 includes a fuel rail 102, a first connection member 110, a second connection member 112, a third connection member 114, a fourth connection member 116, and a fifth connection member 118, and a sixth connection member 120 (collectively referred to herein as "connection members 110-120". The fuel distribution system 100 further includes a first outer fuel line 130, a second outer fuel line 132, a third outer fuel line 134, a fourth outer fuel line 136, a fifth outer fuel line 138, and a sixth outer fuel line 140 (collectively referred to herein as "outer fuel lines 130-140").

The fuel rail 102 is configured to direct fuel from a fuel pump and through the connection members 110-120 such that the fuel flows through the outer fuel lines 130-140. The fuel rail 102 can be manufactured from any material suitable for directing fuel in an automotive environment. Suitable materials include, but are not limited to, steel, aluminum, plastics, composites, or any other material suitable for the purpose of directing fuel in an automotive environment. The connection members 110-120 are outlets in the fuel rail 102 and are configured to provide a secure connection with the outer fuel lines 130-140 to prevent fuel from leaking while fuel is being directed toward the engine. The secure connection can be provided by any suitable connection mechanism including, but not limited to, a threaded connection, a bayonet connection, a quick release coupling, and any other type of connection that can provide for fuel to pass from the fuel rail 102 to the outer fuel lines 130-140 and substantially prevent leakage.

The outer fuel lines 130-140 can be arranged on the fuel rail 102 in a single configuration to provide for modularity of the fuel distribution system 100. As described herein, a "single configuration" refers to the arrangement of the outer fuel lines 130-140 between the fuel rail 102 and the engine. For example, in the single configuration depicted in FIG. 1, the first outer fuel line 130 is coupled to a first connector block 150, the second outer fuel line 132 is coupled to a fourth connector block 156, the third outer fuel line 134 is coupled to a second connector block 152, the fourth outer fuel line 136 is coupled to a fifth connector block 158, the fifth outer fuel line 138 is coupled to a third connector block 154, and the sixth outer fuel line 140 is coupled to a sixth connector block 160. The first connector block 150, the second connector block 152, the third connector block 154, the fourth connector block 156, the fifth connector block 158, and the sixth connector block 160 are collectively referred to herein as "the connector blocks 150-160." Each of the connector blocks 150-160 includes a connection similar to the connection members 110-120 to secure the outer fuel lines 130-140. The connector blocks 150-160 are operable to direct fuel from the outer fuel lines 130-140 to additional fuel lines. Accordingly, the connector blocks 150-160 are manufactured from any material suitable to be coupled to fuel injection lines and direct pressurized fuel toward a fuel injector. Suitable materials include, but are not limited to, steel, aluminum, or any other type of metal or composite that can direct pressurized fuel. Additionally, the outer fuel lines 130-140 are manufactured from any material suitable to be coupled to the fuel rail 102 and direct pressurized fuel to the connector blocks 150-160. Suitable materials include, but are not limited to, steel, aluminum, or any other type of metal, high strength plastics, or composites that can direct pressurized fuel. Arranged as described, the fuel rail 102 provides for a modularity that can be used across different engine sizes and cylinder configurations, with the ability to provide fuel to up to six fuel injectors. The modularity will be further described with reference to FIGS. 2-3.

The fuel distribution system 100 further includes a first inner fuel line 170, a second inner fuel line 172, a third inner fuel line 174, a fourth inner fuel line 176, a fifth inner fuel line 178, and a sixth inner fuel line 180 (collectively referred to herein as "inner fuel lines 170-180"). The inner fuel lines 170-180 are coupled to the connector blocks 150-160 and are configured to direct pressurized fuel from the connector blocks 150-160 to the fuel injectors (not shown). The inner fuel lines 170-180 are manufactured from any material suitable to be coupled to the connector blocks 150-160 and direct pressurized fuel to the fuel injectors. Suitable materials include, but are not limited to, steel, aluminum, or any other type of metal, high strength plastics, or composites that can direct pressurized fuel.

Figure 2:
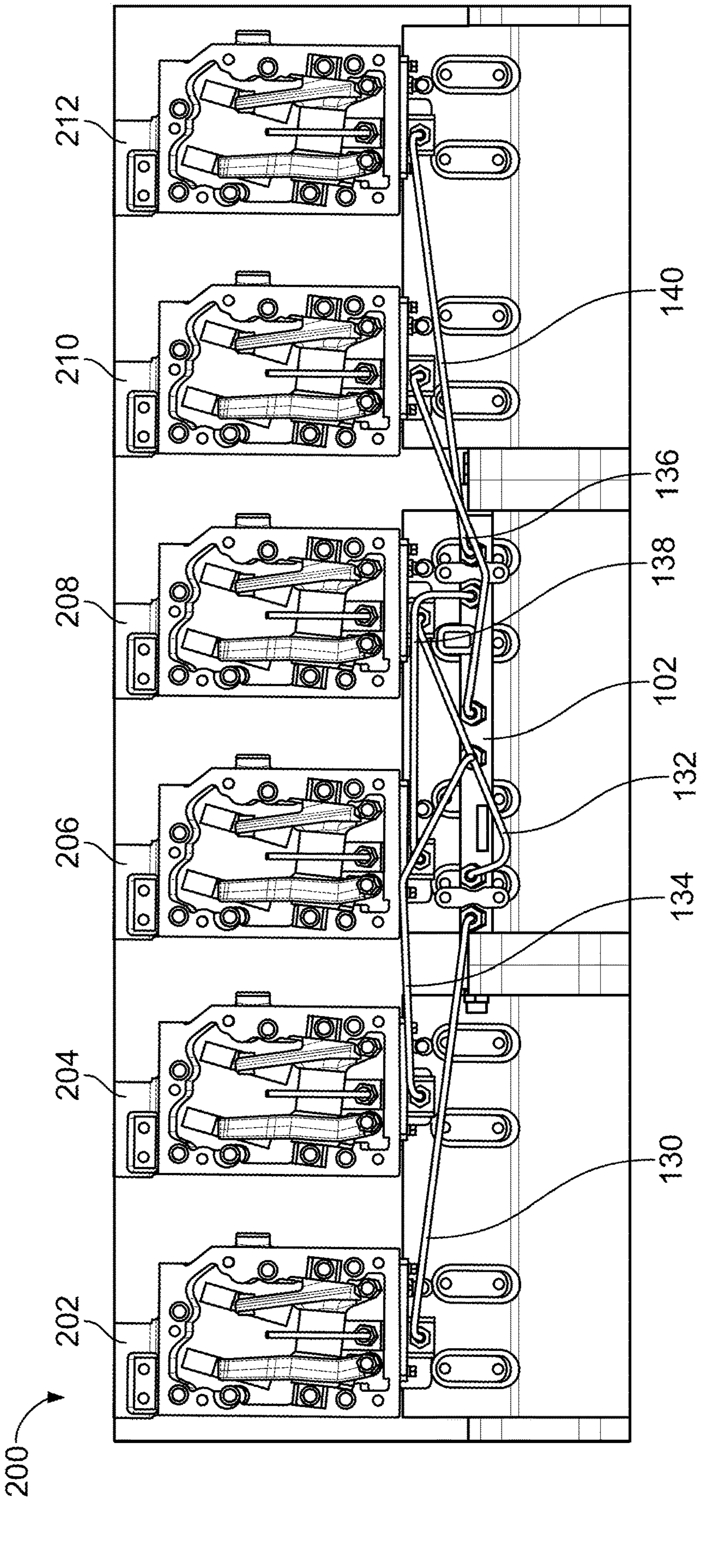
FIG. 2 is an illustration of the fuel distribution system of FIG. 1 coupled to an engine.

FIG. 2 is an illustration of the fuel distribution system 100 of FIG. 1 coupled to an engine 200. In some embodiments, the engine 200 comprises twelve cylinders; however, for purposes of explanation only six of the cylinders are shown. One of ordinary skill in the art would understand that the description of the six cylinders shown also applies to the cylinders not shown. The engine 200 includes a first housing 202, a second housing 204, a third housing 206, a fourth housing 208, a fifth housing 210, and a sixth housing 212 (collectively referred to herein as "housings 202-212"). The housings 202-212 include the fuel injection components required to direct fuel from the outer fuel lines 130-140 to the cylinders for combustion (e.g., the connector blocks 150-160 and the inner fuel lines 170-180). The fuel rail 102 is rigidly coupled to the engine 200 such that the fuel rail 102 does not move relative to the engine 200. The fuel rail 102 may also be removably coupled to the engine 200 for purposes of maintenance. The first inner fuel line 170 is coupled to the first housing 202, the third outer fuel line 134 is coupled to the second housing 204, the fifth outer fuel line 138 is coupled to the third housing 206, the second outer fuel line 132 is coupled to the fourth housing 208, the fourth outer fuel line 136 is coupled to the fifth housing 210, and the sixth outer fuel line 140 is coupled to the sixth housing 212. Accordingly, the outer fuel lines 130-140 are provided in the same arrangement as shown in FIG. 1 and provide fuel to the engine 200. The cylinders not shown in FIG. 2 are provided fuel by an additional fuel rail 102 in the same configuration as described.

Figure 3:
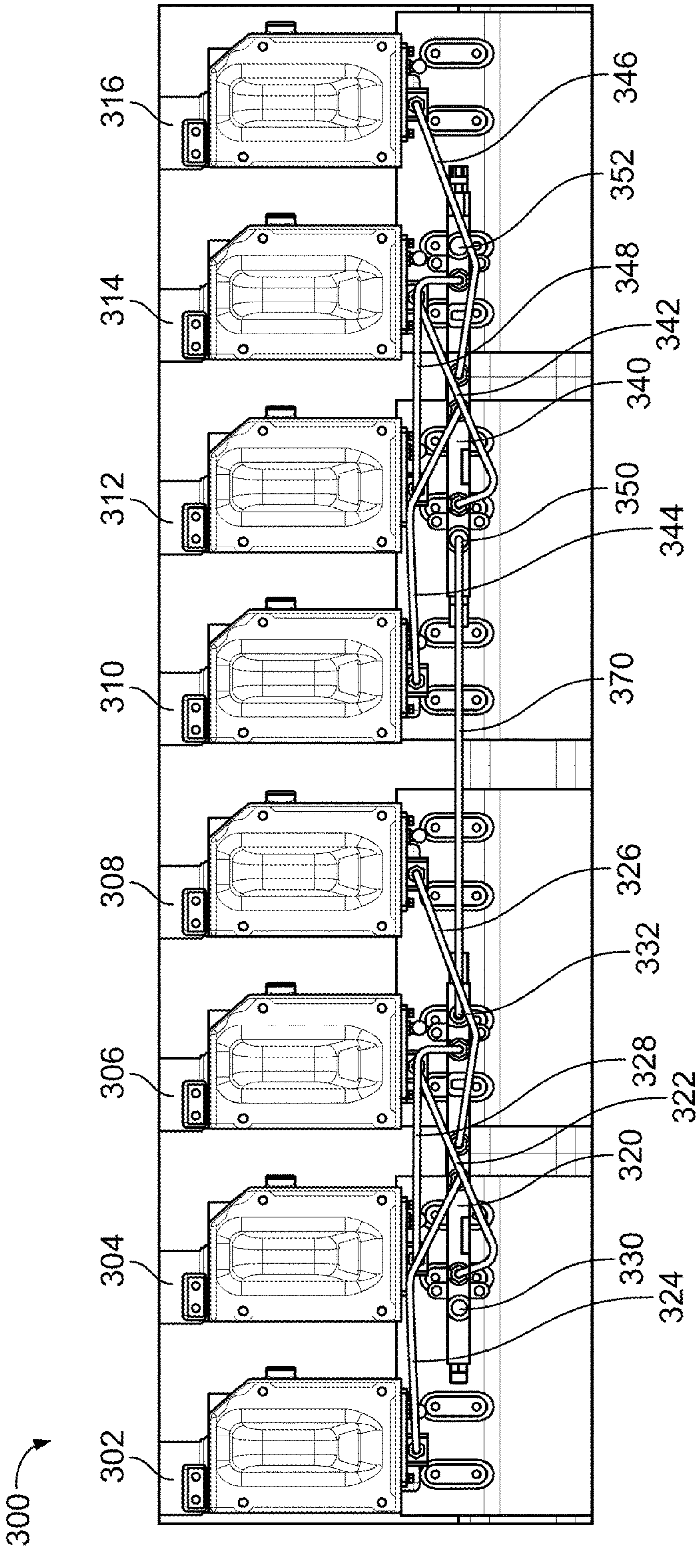
FIG. 3 is an illustration of a plurality of the fuel distribution systems of FIG. 1 coupled to another engine.

FIG. 3 is an illustration of a plurality of the fuel distribution systems 100 of FIG. 1 coupled to an engine 300. In some embodiments, the engine 300 comprises sixteen cylinders; however, for purposes of explanation only eight of the cylinders are shown. One of ordinary skill in the art would understand that the description of the eight cylinders shown also applies to the eight cylinders not shown. The engine 300 includes a first housing 302, a second housing 304, a third housing 306, a fourth housing 308, a fifth housing 310, a sixth housing 312, a seventh housing 314, and an eighth housing 316 (collectively referred to herein as "housings 302-316"). The housings 302-316 include the fuel injection components required to direct fuel from the fuel lines to the cylinders for combustion.

The engine 300 is also shown to include a first fuel rail 320 and a second fuel rail 340. The first fuel rail 320 and the second fuel rail 340 are substantially similar to the fuel rail 102 of FIG. 1; however, the first fuel rail 320 and the second fuel rail 340 are provided different numerals in FIG. 3 for purposes of explanation and clarity. The first fuel rail 320 and the second fuel rail 340 include connection members substantially similar to the connection members 110-120 of the fuel rail 102.

The first fuel rail 320 includes a first connection 330 and a sixth connection 332 that are not connected to inner fuel lines because the first fuel rail 320 provides fuel to only four cylinders. Accordingly, the first connection 330 and the sixth connection 332 are blocked to prevent fuel from leaking out of the first connection 330 and the sixth connection 332. The first connection 330 and the sixth connection 332 can be blocked by any type of mechanism suitable to prevent fuel from leaking (e.g., a removable cap, a non-removable cap, or any other type of blocking mechanism). The first fuel rail 320 also includes a second outer fuel line 322 coupled to the third housing 306, a third outer fuel line 324 coupled to the first housing 302, a fourth outer fuel line 326 coupled to the fourth housing 308, and a fifth outer fuel line 328 coupled to the second housing 304. The second outer fuel line 322 is substantially similar to the second outer fuel line 132, the third outer fuel line 324 is substantially similar to the third outer fuel line 134, the fourth outer fuel line 326 is substantially similar to the fourth outer fuel line 136, and the fifth outer fuel line 328 is substantially similar to the fifth outer fuel line 138. Arranged as described, the first fuel rail 320 provides fuel to the first housing 302, the second housing 304, the third housing 306, and the fourth housing 308.

The second fuel rail 340 includes a first connection 350 and a sixth connection 352 that are not connected to inner fuel lines because the second fuel rail 340 provides fuel to only four cylinders. Accordingly, the first connection 350 and the sixth connection 352 are blocked to prevent fuel from leaking out of the first connection 350 and the sixth connection 352. The first connection 350 and the sixth connection 352 can be blocked by any type of mechanism suitable to prevent fuel from leaking (e.g., a removable cap, a non-removable cap, or any other type of blocking mechanism). The second fuel rail 340 also includes a second outer fuel line 342 coupled to the seventh housing 314, a third outer fuel line 344 coupled to the fifth housing 310, a fourth outer fuel line 346 coupled to the eighth housing 316, and a fifth outer fuel line 348 coupled to the sixth housing 312. The second outer fuel line 342 is substantially similar to the second outer fuel line 132, the third outer fuel line 344 is substantially similar to the third outer fuel line 134, the fourth outer fuel line 346 is substantially similar to the fourth outer fuel line 136, and the fifth outer fuel line 348 is substantially similar to the fifth outer fuel line 138. Arranged as described, the second fuel rail 340 provides fuel to the fifth housing 310, the sixth housing 312, the seventh housing 314, and the eighth housing 316.

The first fuel rail 320 and the second fuel rail 340 are fluidly connected by a conduit 370. The conduit 370 can be any type of system or device through which fuel can be directed between the first fuel rail 320 and the second fuel rail 340 such that fuel can be provided to the housings 302-316. The conduit 370 can be constructed from materials similar to the outer fuel lines 130-140 or the inner fuel lines 170-180.

The cylinders not shown in FIG. 3 are provided fuel by two additional fuel rails substantially similar to the first fuel rail 320 and the second fuel rail 340 in the same configuration as described.

Arranged as described, a plurality of fuel rails substantially similar to the fuel rail 102 can be coupled to provide fuel to a plurality of housings, and the arrangement of outer fuel lines 130-140 can be maintained such that the fuel rail 102 is modular and can be used across various engine sizes and configurations. For example, two of the fuel rail 102 can be used in a six cylinder engine by including three caps on the connection members 110-120 such that only six outer fuel lines provide fuel to the engine.

Figure 4:
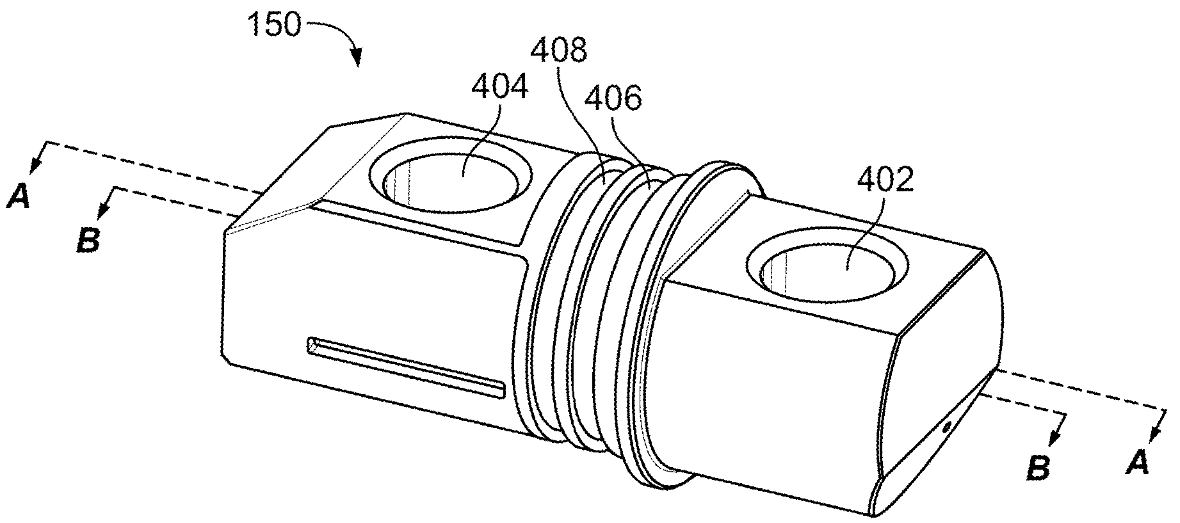
FIG. 4 is an illustration of a connector block, according to a particular embodiment.

FIG. 4 is an illustration of the first connector block 150, according to a particular embodiment. As the connector blocks 150-160 are substantially similar, the description of the first connector block 150 applies to all of the connector blocks 150-160. The first connector block 150 includes a connector block inlet 402, a connector block outlet 404, a first channel 406, and a second channel 408. The connector block inlet 402 is an opening to which an outer fuel line (e.g., the first outer fuel line 130) is coupled. The connector block outlet 404 is an opening to which an inner fuel line (e.g., the first inner fuel line 170) is coupled. The connector block inlet 402 and the connector block outlet 404 are fluidly connected via a fuel path, which will be further described with reference to FIG. 5. The first channel 406 and the second channel 408 are grooves located in the first connector block 150, and are sized and configured to secure a sealing component, such as an o-ring. The sealing component is configured to create a seal between the first connector block 150 and a housing (e.g., the first housing 202) when the first connector block 150 is coupled to the first housing 202.

Figure 5:
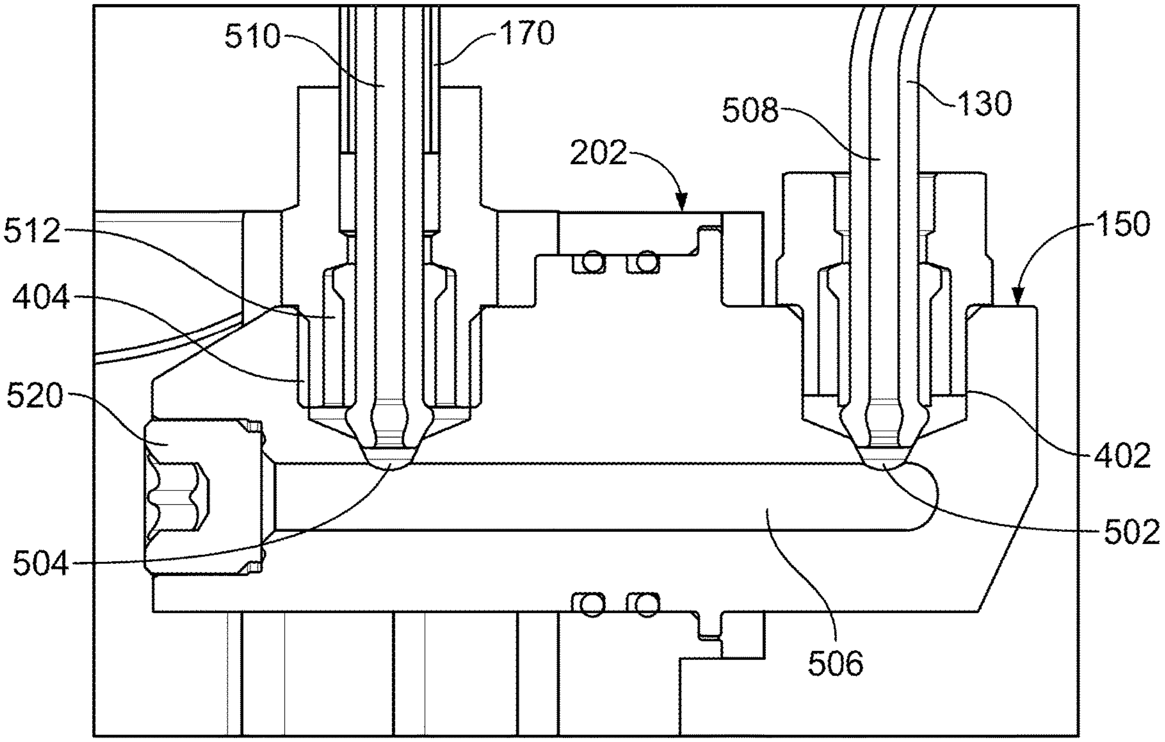
FIG. 5 is an illustration of a cross-section of the connector block of FIG. 4.

FIG. 5 is an illustration of a cross-section taken across section A-A of the first connector block 150 of FIG. 4 assembled with the first housing 202 of FIG. 2. Section A-A is taken through the center of the first connector block 150. The first outer fuel line 130 further includes an outer fuel line path 508 through which fuel flows to reach the first connector block 150. The first inner fuel line 170 further includes an inner fuel line path 510 through which fuel flows to reach the fuel injector, and a cavity 512. The cavity 512 is a space around the connection between the first inner fuel line 170 and the connector block outlet 404 in which fuel leaked from the fuel injector is accumulated such that it can be directed away from the first connector block 150. The cavity 512 is in fluid communication with a leak path (not shown) that will be further described with reference to FIG. 6.

The first connector block 150 includes an outer fuel line aperture 502, an inner fuel line aperture 504, a fuel accumulator 506, and a plug 520. The outer fuel line aperture 502 is an opening in the connector block inlet 402 through which fuel can flow from the outer fuel line path 508 to the fuel accumulator 506. The inner fuel line aperture 504 is an opening in the connector block outlet 404 through which fuel can flow from the fuel accumulator 506 to the inner fuel line path 510. The fuel accumulator 506 is a cavity within the first connector block 150 through which fuel flows between the outer fuel line aperture 502 and the inner fuel line aperture 504. The fuel accumulator 506 is operable to hold a volume of fuel sufficient to reduce loss of fuel pressure along the fuel circuit from the fuel rail 102 to a fuel injector. For example, in event of a pressure loss at a fuel injector, the volume of fuel available in the fuel accumulator 506 is sufficient to reduce the pressure loss by providing additional fuel to flow. The size and/or configuration of the fuel accumulator 506 can be modified based on the desired fuel volume and/or fuel flowrate from the first outer fuel line 130 to the first inner fuel line 170. The desired fuel volume and/or fuel flowrate in the fuel accumulator 506 may be based on the desired performance of the engine in which the connector block 150 is installed. For example, in an engine in which high performance is desired, the fuel accumulator 506 may need to be large (e.g, between approximately ten millimeters and approximately thirty millimeters in diameter). In an engine in which minimum performance is sufficient, the fuel accumulator 506 may not need to be large (e.g., between approximately three millimeters and approximately six millimeters in diameter in a specific implementation). In embodiments in which standard engine performance is desired, the fuel accumulator 506 may be between approximately six millimeters and approximately ten millimeters in diameter, for example. The shape of the connector block 150 is such that the connector block 150 is compatible with various types of engines, and the diameter of the fuel accumulator 506 can be modified based on the type of engine in which the connector block 150 is installed. Accordingly, the connector block 150 provides a manufacturer with greater efficiency as a single design of the connector block 150 can be used for a plurality of engines.

The plug 520 is configured to interface with the connector block 150 to prevent fuel from leaking out of the fuel accumulator 506. The plug 520 can be manufactured from any material suitable for creating a seal with the connector block 150 (e.g., rubber, plastic, etc.). In some embodiments, the plug 520 is a unitary component. The plug 520 can also include multiple components configured to create a seal with the connector block 150. In one non-limiting example, the plug 520 may include a base component around which one or more sealing components (e.g., o-rings, etc.) are disposed such that the sealing components interface with the connector block 150 to create a seal therebetween.

Figure 6:
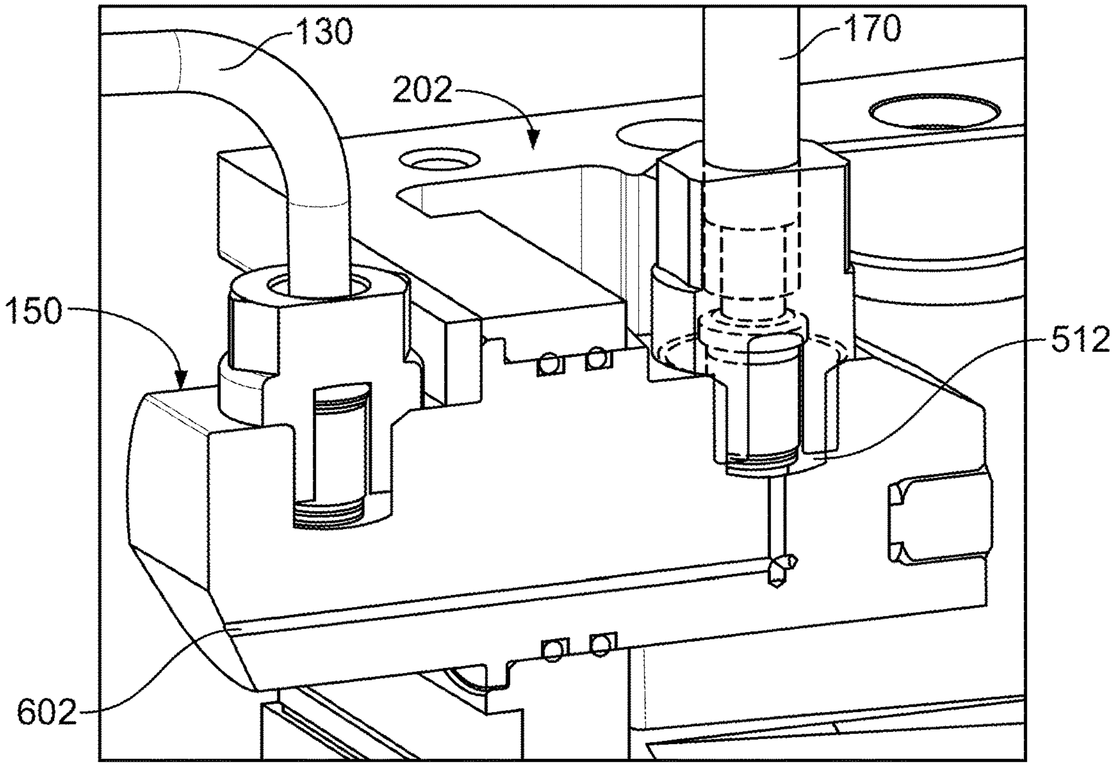
FIG. 6 is an illustration of another cross-section of the connector block of FIG. 4.

FIG. 6 is an illustration of a cross-section taken across section B-B of the first connector block 150 of FIG. 4 coupled to the first housing 202 of FIG. 2. Section B-B is offset from the center of the first connector block 150 and is not co-planar with Section A-A. The first connector block 150 includes a leak path 602 fluidly coupled to the cavity 512. Fuel that accumulates in the cavity 512 from the first inner fuel line 170 is directed into the leak path 602 such that the fuel is directed away from the first connector block 150. In some embodiments, the leak path 602 directs fuel to the outside of the engine such that there is a visible indicator of a fuel leak to indicate that a repair is needed.

Figure 7:
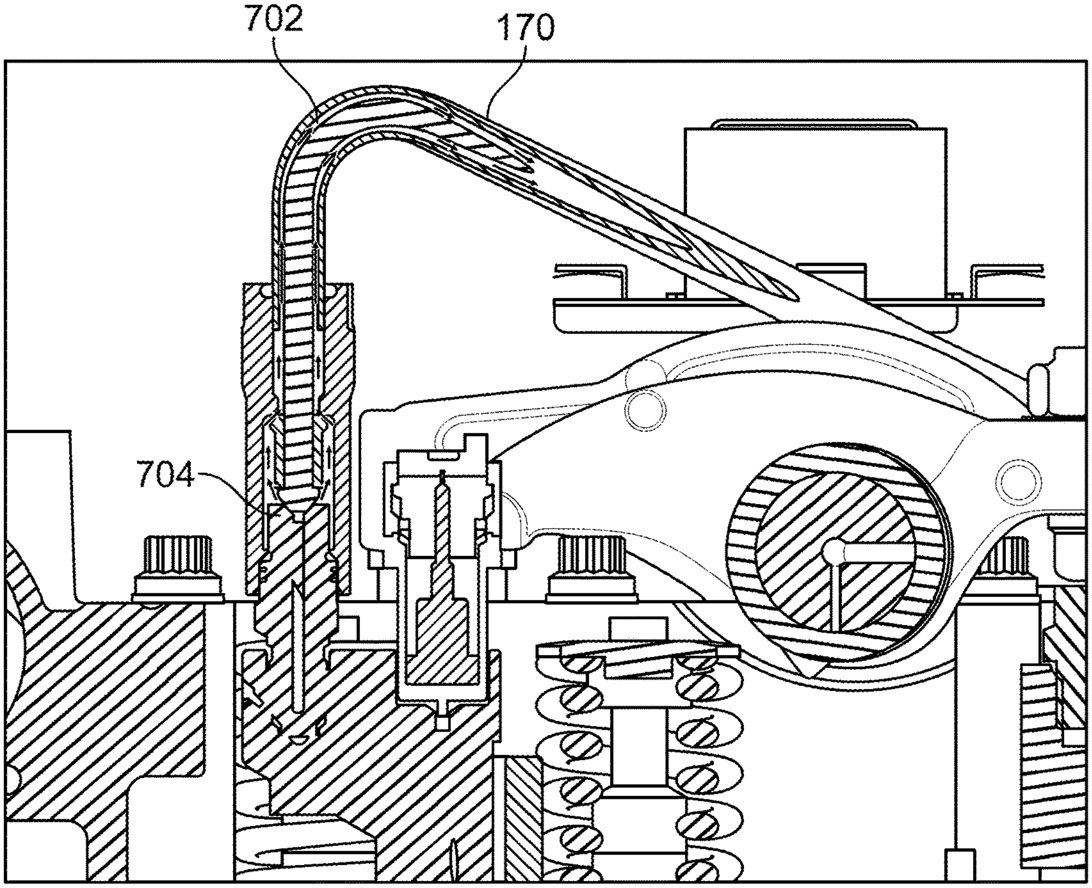
FIG. 7 is an illustration of an outer fuel line coupled to an injector joint, according to a particular embodiment.

FIG. 7 is an illustration of the first inner fuel line 170 coupled to an injector joint 704, according to a particular embodiment. The injector joint 704 is the location at which the first inner fuel line 170 is coupled to a fuel injector. When coupled together, fuel flows from the first inner fuel line 170 to the fuel injector such that fuel can be injected into a cylinder to provide for combustion. In some embodiments, some of the fuel from the first inner fuel line 170 does not reach the fuel injector and thus leaks from the first inner fuel line 170. A sealing component (e.g., an o-ring) prevents the leaked fuel from leaking into additional engine components such that the leaked fuel accumulates in a groove 702. The groove 702 is a space that is separate from the inner fuel line path 510 and provides a path for leaked fuel to flow away from additional engine components. Accordingly, the groove 702 serves to create a fuel line with multiple walls to provide for multiple fuel flows. The leaked fuel follows the path of the arrows as shown in FIG. 7 such that the leaked fuel fills the cavity 512 and flows through the leak path 602 as described with reference to FIGS. 5 and 6. In some embodiments, the outer fuel lines 130-140 and the inner fuel lines 170-180 can include multiple walls to account for fuel leakage. For example, in embodiments where more stringent safety requirements must be met (e.g., in a marine engine), the outer fuel lines 130-140 and the inner fuel lines 170-180 may include multiple walls as described such that leaking fuel may be directed away from sensitive engine components. In some arrangements, only one of the outer fuel lines 130-140 and the inner fuel lines 170-180 can include multiple walls to account for fuel leakage.

Figure 8:
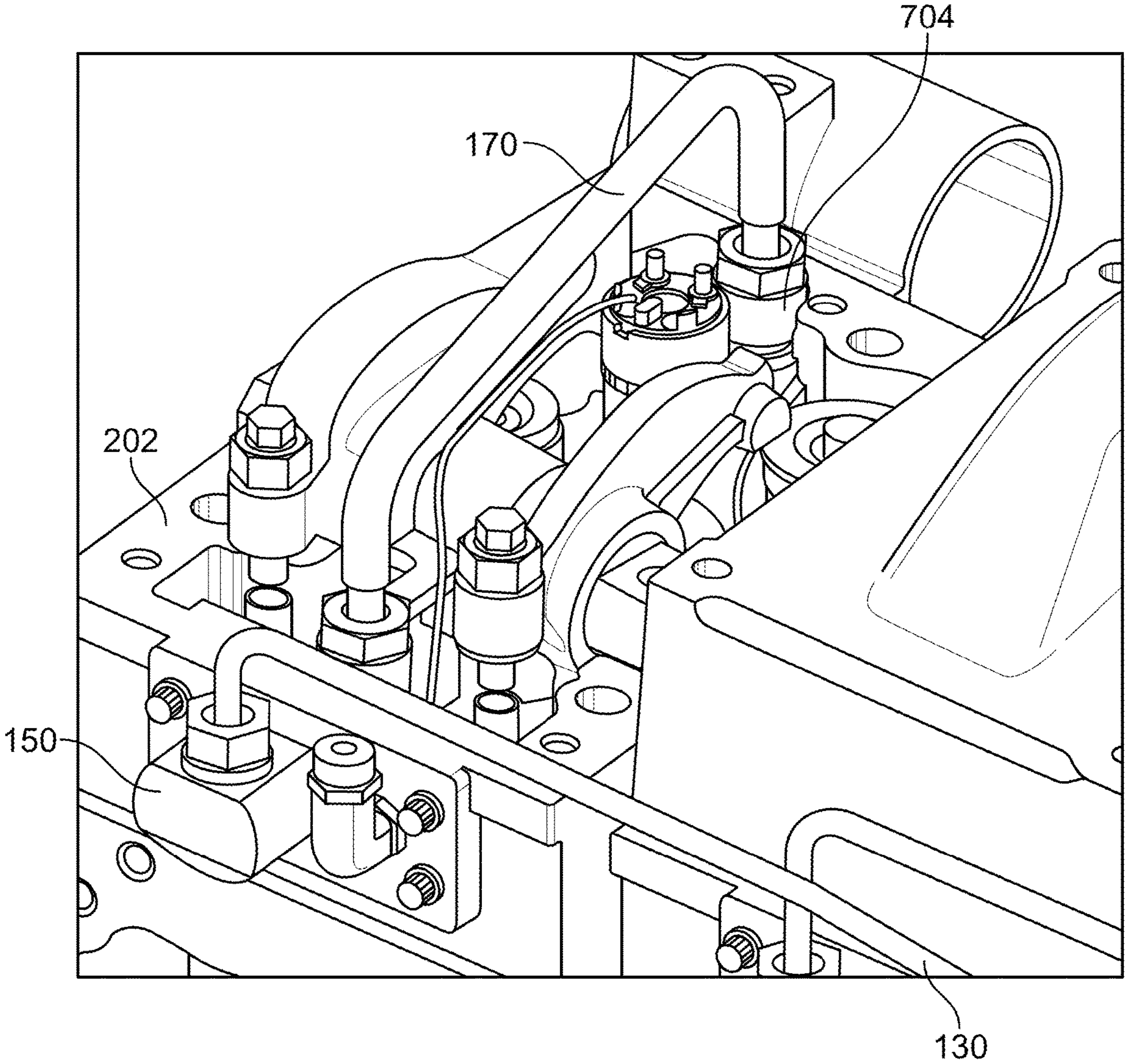
FIG. 8 is an illustration of a portion of the fuel distribution system of FIG. 1 coupled to an injector positioned under an engine valve cover (not shown).

FIG. 8 is an illustration of a portion of the fuel distribution system 100 of FIG. 1 coupled to an injector positioned under an engine valve cover (not shown). The fuel rail 102 (not shown) provides fuel to the first outer fuel line 130. The fuel flows through the first outer fuel line 130 and into the first connector block 150. The fuel flows through the first connector block 150 and into the first inner fuel line 170 such that the fuel reaches the fuel injector to be injected into the cylinder for combustion. Fuel that does not reach the fuel injector (e.g., fuel that leaks) flows back through the first inner fuel line 170 to the first connector block 150 such that the leaked fuel is directed away from the first housing 202 via the leak path 602 (not shown). The leaked fuel can then be collected for further use or vented. Arrange as described, the fuel distribution system 100 serves to route fuel that leaks at the fuel injector away from the hot components of the engine, thereby avoiding the risk of fuel dripping or spraying on hot areas.

Figure 9:
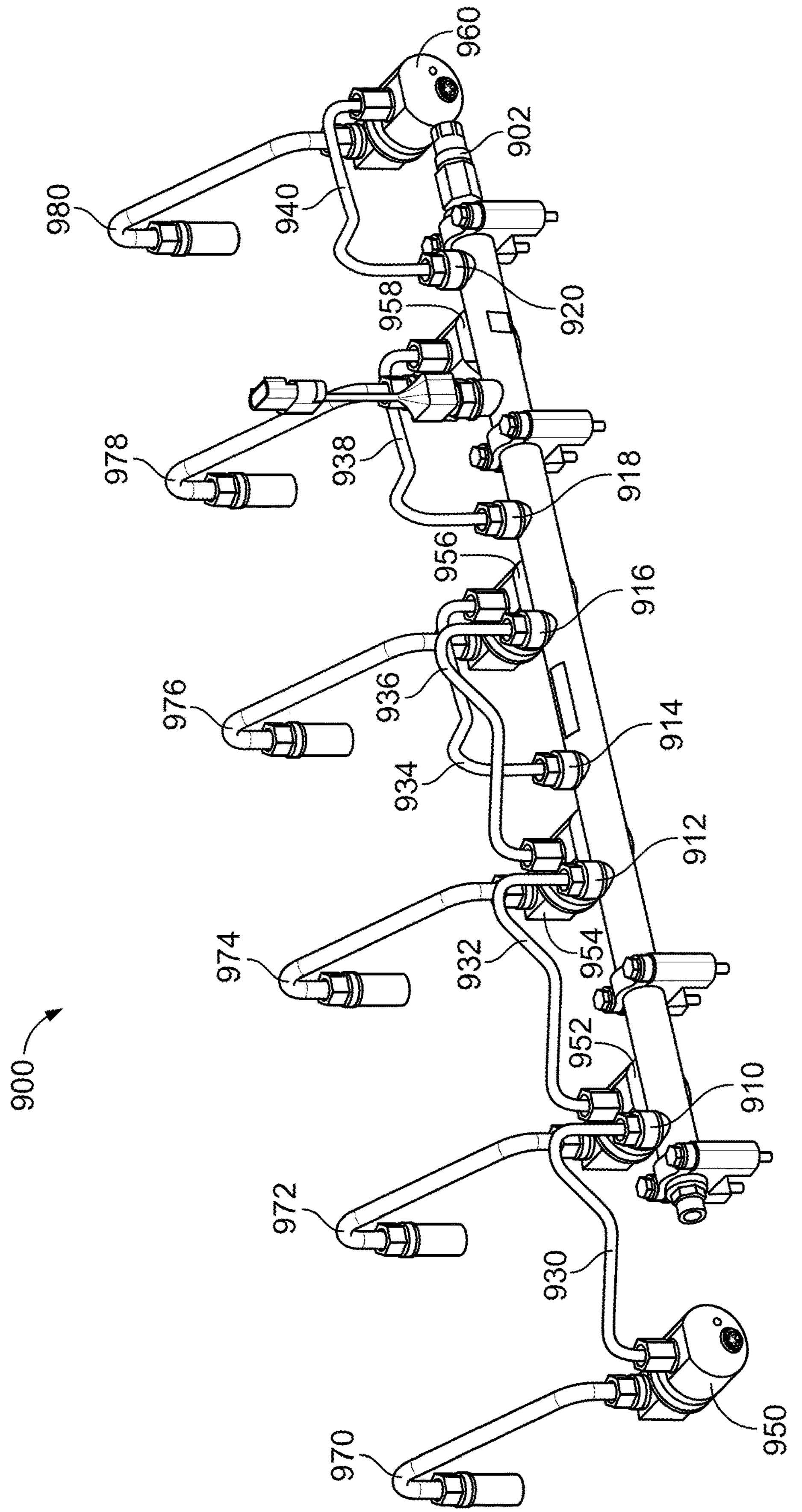
FIG. 9 is an illustration of another fuel distribution system, according to a particular embodiment.

FIG. 9 is an illustration of a fuel distribution system 900, according to another particular embodiment. The fuel distribution system 900 of FIG. 9 includes a fuel rail 902, a first connection member 910, a second connection member 912, a third connection member 914, a fourth connection member 916, a fifth connection member 918, and a sixth connection member 920 (collectively referred to herein as "connection members 910-920". The fuel distribution system 900 further includes a first outer fuel line 930, a second outer fuel line 932, a third outer fuel line 934, a fourth outer fuel line 936, a fifth outer fuel line 938, and a sixth outer fuel line 940 (collectively referred to herein as "outer fuel lines 930-940").

The fuel rail 902 is substantially similar to the fuel rail 102 of FIG. 1, the connection members 910-920 are substantially similar to the connection members 110-120 of FIG. 1, and the outer fuel lines 930-940 are substantially similar to the outer fuel lines 130-140 of FIG. 1 such that the descriptions of these elements with respect to FIG. 1 apply to the corresponding elements of FIG. 9.

The single configuration of the outer fuel lines 930-940 differs from the single configuration of the outer fuel lines 130-140 of FIG. 1. For example, in the single configuration depicted in FIG. 9, the first outer fuel line 930 is coupled to a first connector block 950, the second outer fuel line 932 is coupled to a second connector block 152, the third outer fuel line 934 is coupled to a fourth connector block 956, the fourth outer fuel line 936 is coupled to a third connector block 954, the fifth outer fuel line 938 is coupled to a fifth connector block 958, and the sixth outer fuel line 940 is coupled to a sixth connector block 960. The first connector block 950, the second connector block 952, the third connector block 954, the fourth connector block 956, the fifth connector block 958, and the sixth connector block 160 are collectively referred to herein as "the connector blocks 950-960."

The fuel distribution system 900 further includes a first inner fuel line 970, a second inner fuel line 972, a third inner fuel line 974, a fourth inner fuel line 976, a fifth inner fuel line 978, and a sixth inner fuel line 980 (collectively referred to herein as "inner fuel lines 970-980"). The inner fuel lines 970-980 are coupled to the connector blocks 950-960 and are configured to direct pressurized fuel from the connector blocks 950-960 to the fuel injectors (not shown).

Figure 10:
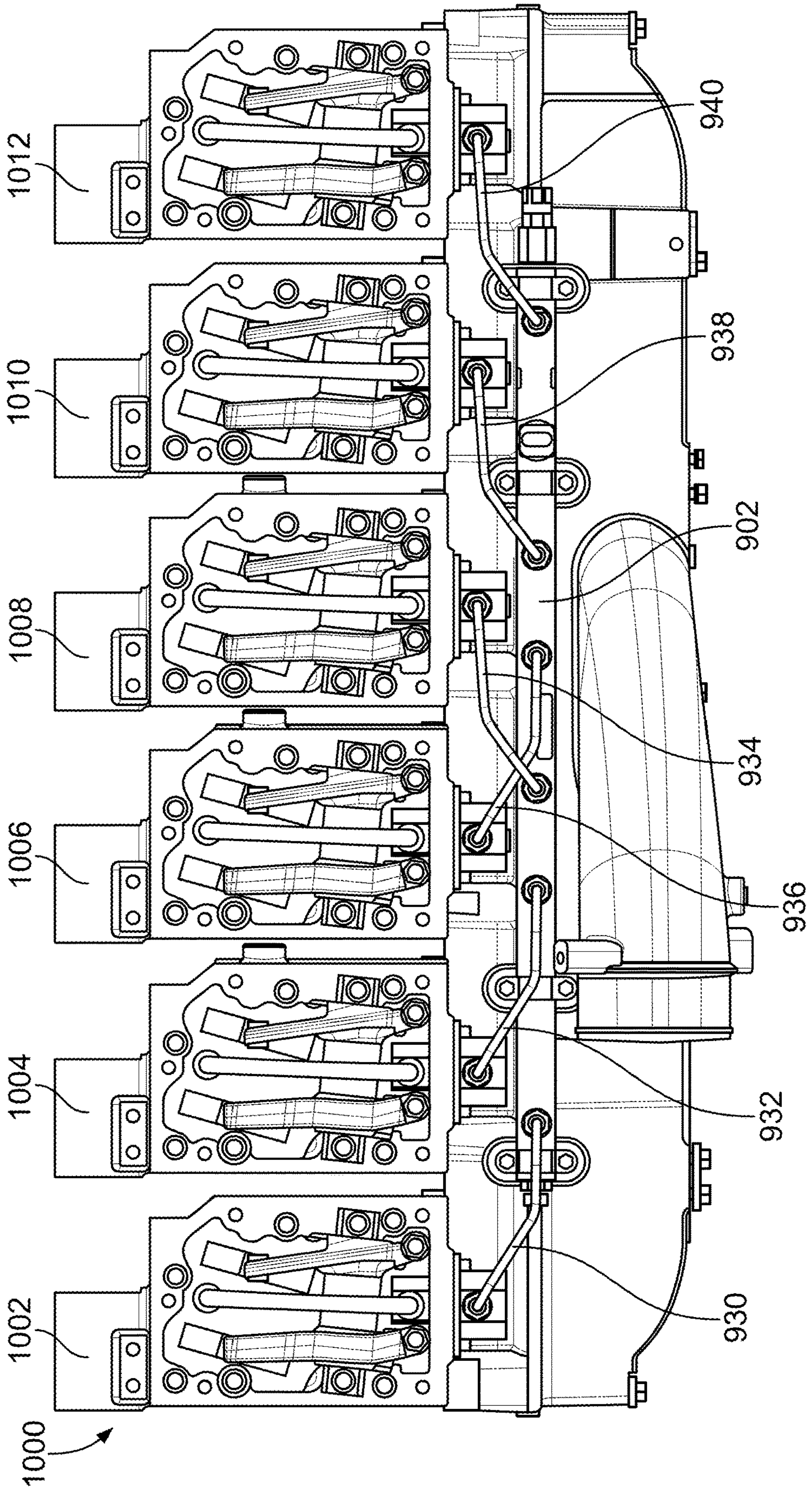
FIG. 10 is an illustration of the fuel distribution system of FIG. 9 coupled to an engine.

FIG. 10 is an illustration of the fuel distribution system 900 of FIG. 9 coupled to an engine 1000. In some embodiments, the engine 1000 comprises twelve cylinders; however, for purposes of explanation only six of the cylinders are shown. One of ordinary skill in the art would understand that the description of the six cylinders shown in FIG. 10 also applies to the cylinders not shown. The engine 1000 includes a first housing 1002, a second housing 1004, a third housing 1006, a fourth housing 1008, a fifth housing 1010, and a sixth housing 1012 (collectively referred to herein as "housings 1002-1012"). The housings 1002-1012 include the fuel injection components required to direct fuel from the outer fuel lines 930-940 to the cylinders for combustion (e.g., the connector blocks 950-960 and the inner fuel lines 970-980). The fuel rail 902 is rigidly coupled to the engine 1000 such that the fuel rail 902 does not move relative to the engine 1000. The fuel rail 902 may also be removably coupled to the engine 1000 for purposes of maintenance. The first outer fuel line 930 is coupled to the first housing 1002, the second outer fuel line 932 is coupled to the second housing 1004, the fourth outer fuel line 936 is coupled to the third housing 1006, the third outer fuel line 934 is coupled to the fourth housing 1008, the fifth outer fuel line 936 is coupled to the fifth housing 1010, and the sixth outer fuel line 940 is coupled to the sixth housing 1012. Accordingly, the outer fuel lines 930-940 are provided in the same arrangement as shown in FIG. 9 and provide fuel to the engine 1000. The cylinders not shown in FIG. 10 are provided fuel by an additional fuel rail 902 in the same configuration as described.

Figure 11:
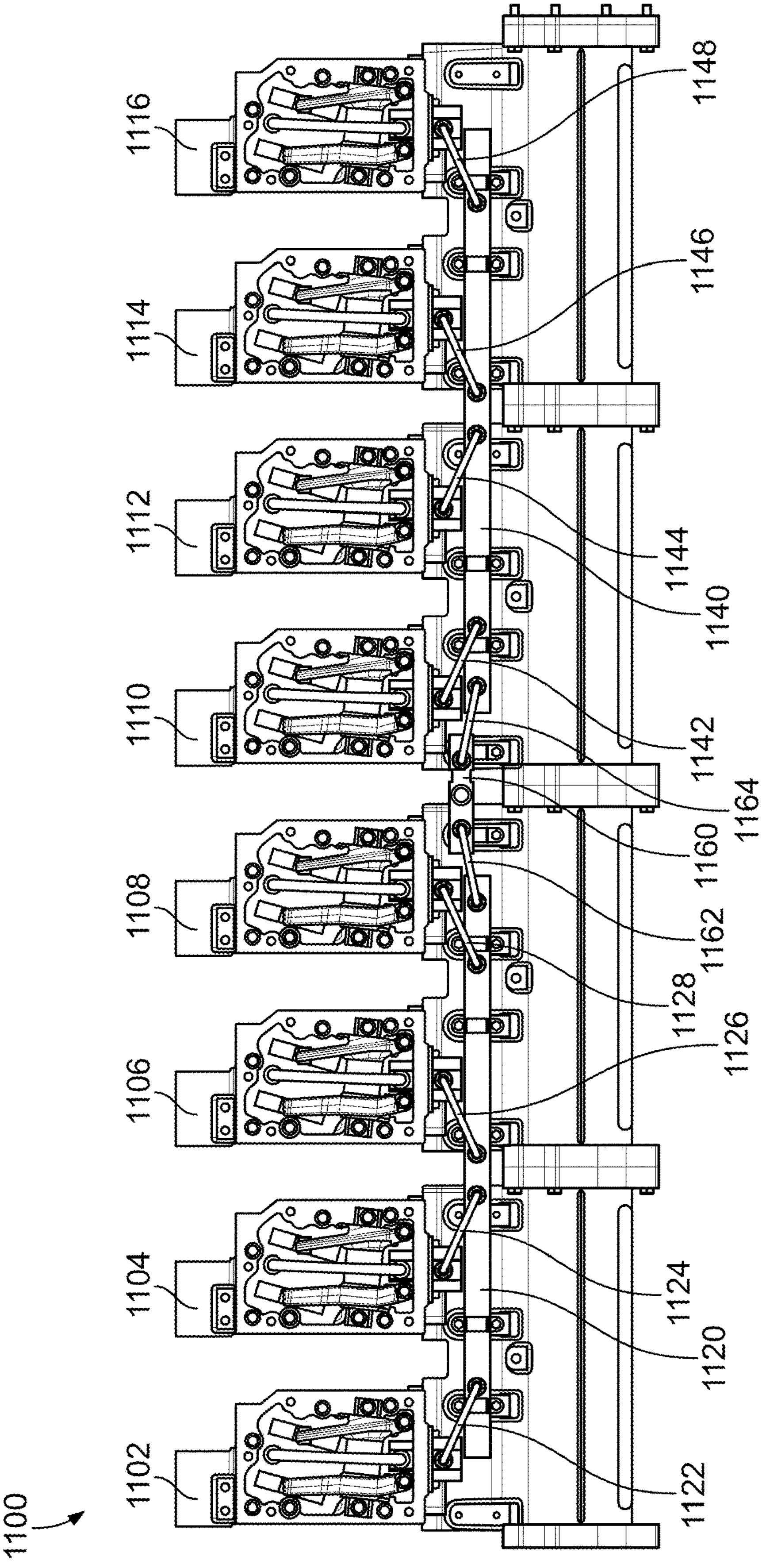
FIG. 11 is an illustration of a plurality of the fuel distribution systems of FIG. 9, coupled to another engine.

FIG. 11 is an illustration of a plurality of the fuel distribution systems 900 of FIG. 9 coupled to an engine 1100. In some embodiments, the engine 1100 comprises sixteen cylinders; however, for purposes of explanation only eight of the cylinders are shown. One of ordinary skill in the art would understand that the description of the eight cylinders shown also applies to the eight cylinders not shown. The engine 1100 includes a first housing 1102, a second housing 1104, a third housing 1106, a fourth housing 1108, a fifth housing 1110, a sixth housing 1112, a seventh housing 1114, and an eighth housing 1116 (collectively referred to herein as "housings 1102-1116"). The housings 1102-1116 include the fuel injection components required to direct fuel from the fuel lines to the cylinders for combustion.

The engine 1100 is also shown to include a first fuel rail 1120 and a second fuel rail 1140. The first fuel rail 1120 and the second fuel rail 1140 are substantially similar to the fuel rail 902 of FIG. 1; however, the first fuel rail 1120 and the second fuel rail 1140 are provided different numerals in FIG. 11 for purposes of explanation and clarity. The first fuel rail 1120 and the second fuel rail 1140 include connection members substantially similar to the connection members 910-920 of the fuel rail 902. In some embodiments, the first fuel rail 1120 and the second fuel rail 1140 include more or fewer connection members than the fuel rail 902. The number of connection members present on the first fuel rail 1120 and the second fuel rail 1140 depends on the number of cylinders to which the first fuel rail 1120 and the second fuel rail 1140 supply fuel. In the embodiment shown in FIG. 11, the first fuel rail 1120 and the second fuel rail 1140 each include five connection members.

The first fuel rail 1120 includes a first outer fuel line 1122 coupled to the first housing 1102, a second outer fuel line 1124 coupled to the second housing 1104, a third outer fuel line 1126 coupled to the third housing 1106, and a fourth outer fuel line 1128 coupled to the fourth housing 1108. The first outer fuel line 1122 is substantially similar to the first outer fuel line 930, the second outer fuel line 1124 is substantially similar to the second outer fuel line 932, the third outer fuel line 1126 is substantially similar to the third outer fuel line 934, and the fourth outer fuel line 1128 is substantially similar to the fourth outer fuel line 936. Arranged as described, the first fuel rail 1120 provides fuel to the first housing 1102, the second housing 1104, the third housing 1106, and the fourth housing 1108.

The second fuel rail 1140 includes a first outer fuel line 1142 coupled to the fifth housing 1110, a second outer fuel line 1144 coupled to the sixth housing 1112, a third outer fuel line 1146 coupled to the seventh housing 1114, and a fourth outer fuel line 1148 coupled to the eighth housing 1116. The first outer fuel line 1142 is substantially similar to the first outer fuel line 930, the second outer fuel line 1144 is substantially similar to the second outer fuel line 932, the third outer fuel line 1146 is substantially similar to the third outer fuel line 934, and the fourth outer fuel line 1148 is substantially similar to the fourth outer fuel line 936. Arranged as described, the first fuel rail 1120 provides fuel to the fifth housing 1110, the sixth housing 1112, the seventh housing 1114, and the eighth housing 1116.

The first fuel rail 1120 and the second fuel rail 1140 are fluidly connected by a conduit 1160. The conduit 1160 can be any type of system or device through which fuel can be directed substantially simultaneously to both the first fuel rail 1120 and the second fuel rail 1140 such that fuel can be provided to the housings 1102-1116. The conduit 1160 is fluidly coupled to the first fuel rail 1120 via a first conduit fuel line 1162 and is fluidly coupled to the second fuel rail 1140 via a second conduit fuel line 1164. The conduit 1160 can be constructed from materials similar to the outer fuel lines 930-940 or the inner fuel lines 970-980. In operation, fuel flows through the conduit 1160 to reach the first fuel rail 1120 and the second fuel rail 1160. Accordingly, the first fuel rail 1120 and the second fuel rail 1140 are arranged in parallel.

The cylinders not shown in FIG. 11 are provided fuel by two additional fuel rails substantially similar to the first fuel rail 1120 and the second fuel rail 1140 in the same configuration as described.

Arranged as described, a plurality of fuel rails substantially similar to the fuel rail 902 can be coupled to provide fuel to a plurality of housings, and the arrangement of outer fuel lines 930-940 can be maintained such that the fuel rail 902 is modular and can be used across various engine sizes and configurations. For example, two of the fuel rail 902 can be used in a six cylinder engine by including caps on the connection members 910-920 such that only six outer fuel lines provide fuel to the engine.

Figure 12:
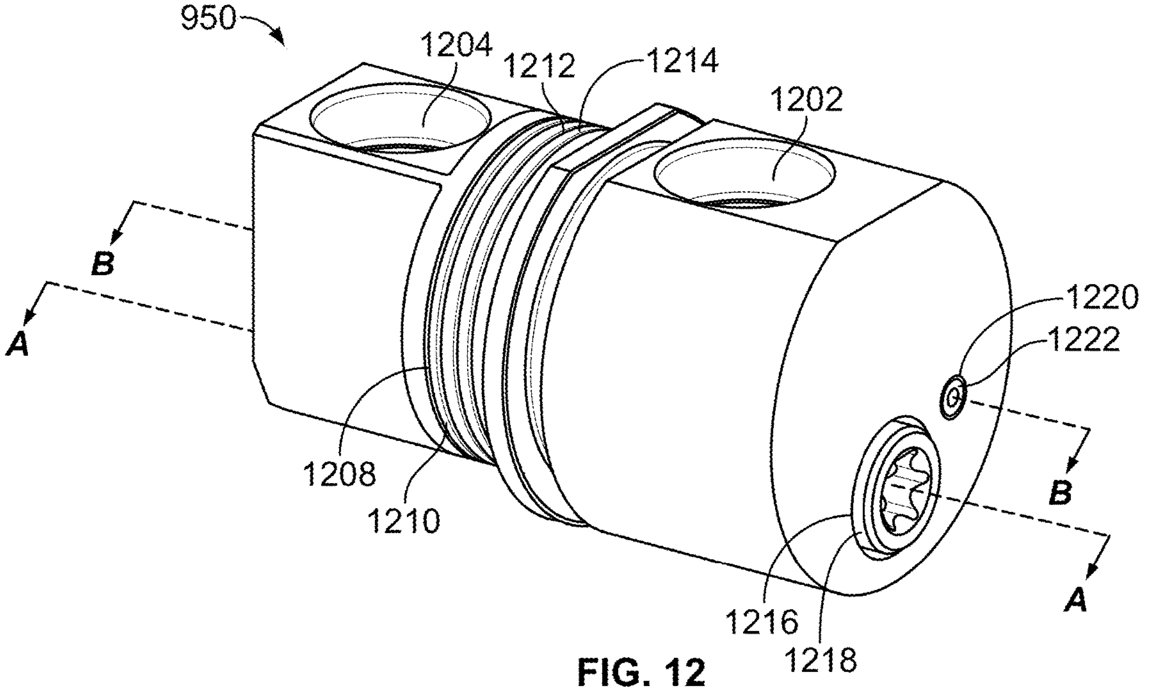
FIG. 12 is an illustration of another connector block, according to a particular embodiment.

FIG. 12 is an illustration of the first connector block 950, according to a particular embodiment. As the connector blocks 950-960 are substantially similar, the description of the first connector block 950 applies to all of the connector blocks 950-960. The first connector block 950 includes a connector block inlet 1202, a connector block outlet 1204, a first channel 1208, and a second channel 1212. The connector block inlet 1202 is an opening to which an outer fuel line (e.g., the first outer fuel line 930) is coupled. The connector block outlet 1204 is an opening to which an inner fuel line (e.g., the first inner fuel line 970) is coupled. The connector block inlet 1202 and the connector block outlet 1204 are fluidly connected via a fuel path, which will be further described with reference to FIG. 13. The first channel 1208 and the second channel 1212 are grooves located in the first connector block 950, and are sized and configured to secure a sealing component. For example, a first sealing component 1210 is sized to fit within the first channel 1208 and a second sealing component 1214 is sized to fit within the second channel 1212. The first sealing component 1210 and the second sealing component 1212 are configured to create a seal between the first connector block 950 and a housing (e.g., the first housing 1002) when the first connector block 950 is coupled to the first housing 1002.

The first connector block 950 defines an aperture 1216 sized and configured to receive a first plug 1218. The first plug 1218 is further described with reference to FIG. 13. The first connector block 950 also defines an opening 1220 sized and configured to receive a second plug 1222. The second plug 1222 is further described with reference to FIG. 14.

Figure 13:
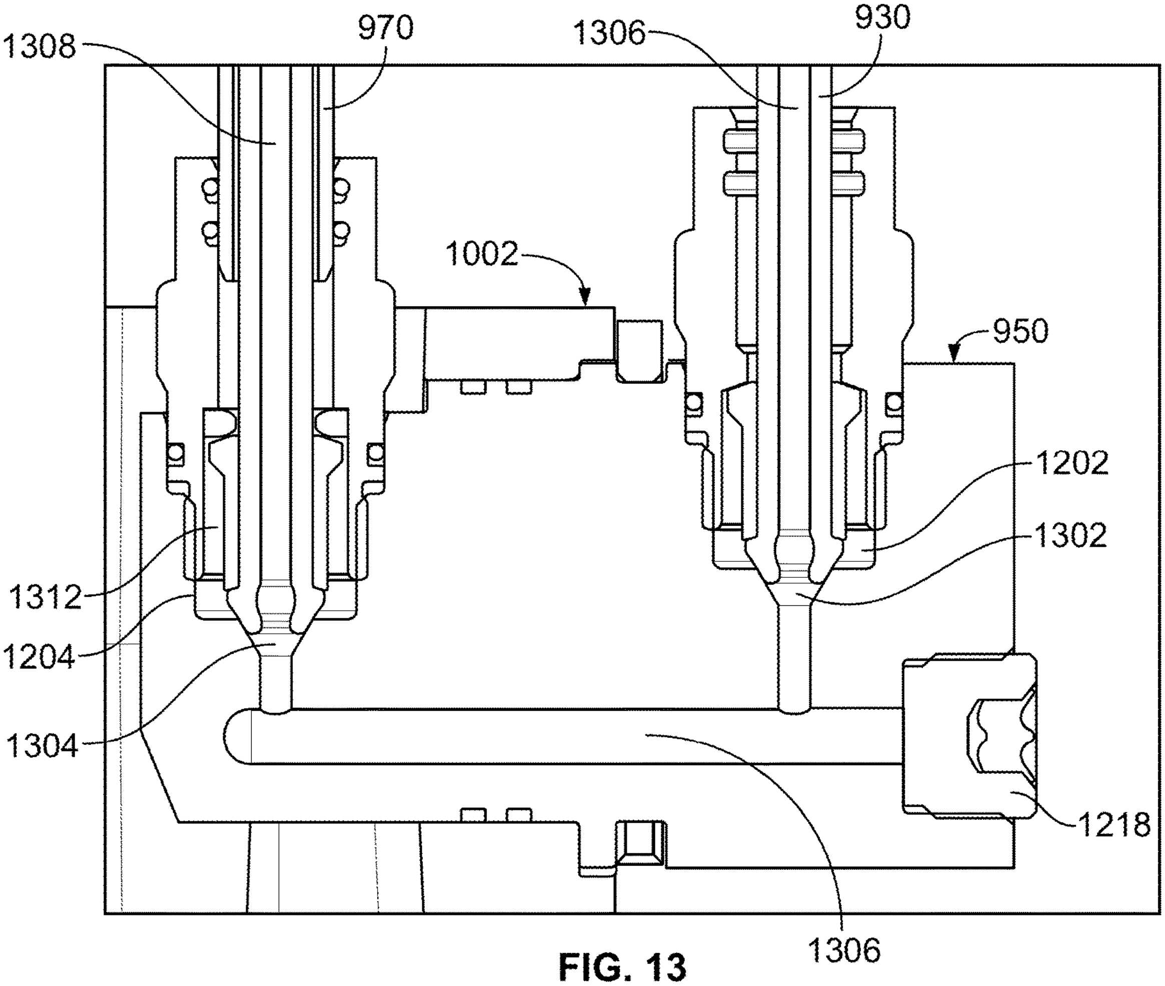
FIG. 13 is an illustration of a cross-section of the connector block of FIG. 12.

FIG. 13 is an illustration of a cross-section taken across section A-A of the first connector block 950 of FIG. 12 assembled with the first housing 1002 of FIG. 10. Section A-A is taken through the center of the first connector block 950. The first outer fuel line 930 further includes an outer fuel line path 1306 through which fuel flows to reach the first connector block 950. The first inner fuel line 970 further includes an inner fuel line path 1308 through which fuel flows to reach the fuel injector, and a cavity 1312. The cavity 1312 is a space around the connection between the first inner fuel line 970 and the connector block outlet 1204 in which fuel leaked from the fuel injector is accumulated such that it can be directed away from the first connector block 950. The cavity 1312 is in fluid communication with a leak path (not shown) that will be further described with reference to FIG. 14.

The first connector block 950 includes an outer fuel line aperture 1302, an inner fuel line aperture 1304, a fuel accumulator 1306, and the first plug 1218. The outer fuel line aperture 1302 is substantially similar to the outer fuel line aperture 502 of FIG. 5, and the inner fuel line aperture 1304 is substantially similar to the inner fuel line aperture 504 of FIG. 5. Accordingly, the descriptions of the outer fuel line aperture 502 and the inner fuel line aperture 504 apply to the outer fuel line aperture 1302 and the inner fuel line aperture 1304, respectively. The fuel accumulator 1306 is substantially similar to the fuel accumulator 506; accordingly, the description of the fuel accumulator 506 applies to the fuel accumulator 1306. The first plug 1218 is substantially similar to the plug 520, with the only difference being the location of the plug relative to the first connector block 950 (e.g., the plug 520 is positioned on an end of the first connector block 150 closest to the connector block outlet 404, and the first plug 1218 is positioned on an end of the first connector block 950 closest to the connector block inlet 1202). Aside from that difference, the description of the plug 520 applies to the first plug 1218.

Figure 14:
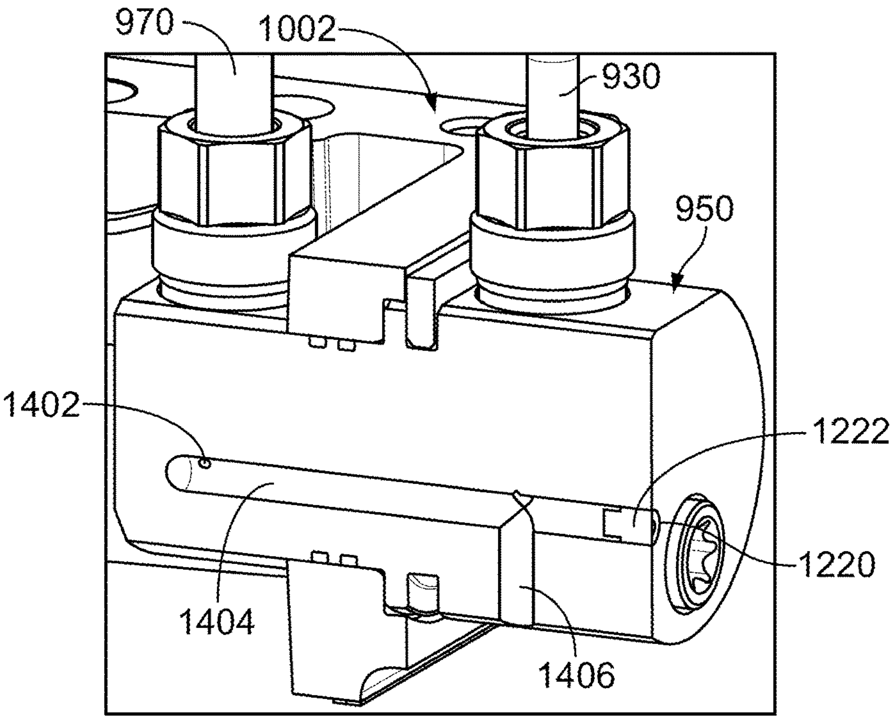
FIG. 14 is an illustration of another cross-section of the connector block of FIG. 12.

FIG. 14 is an illustration of a cross-section taken across section B-B of the first connector block 950 of FIG. 12 coupled to the first housing 1002 of FIG. 10. Section B-B is offset from the center of the first connector block 950 and is not co-planar with Section A-A. The first connector block 950 includes a first leak path 1402 fluidly coupled to the cavity 1312. Fuel that accumulates in the cavity 1312 from the first inner fuel line 970 is directed into the first leak path 1402 such that the fuel is directed away from the first connector block 950. The first leak path 1402 is fluidly coupled to a second leak path 1404 that directs fuel from the first leak path 1402 to a third leak path 1406. The third leak path 1406 directs fuel out of the first connector block 950. In some embodiments, the third leak path 1406 directs fuel to the outside of the engine such that there is a visible indicator of a fuel leak to indicate that a repair is needed. The second plug 1222 is configured to interface with the opening 1220 to prevent fuel from leaking out of the second leak path 1404. The second plug 1222 can be manufactured from any material suitable for creating a seal between the second plug 1222 and the first connector block 950 (e.g., rubber, plastic, etc.). In some embodiments, the second plug 1222 is a unitary component. The second plug 1222 can also include multiple components configured to create a seal between the second plug 1222 and the first connector block 950. In one non-limiting example, the second plug 1222 may include a base component around which one or more sealing components (e.g., o-rings, etc.) are disposed such that the sealing components interface with the first connector block 950 to create a seal.

Figure 15:
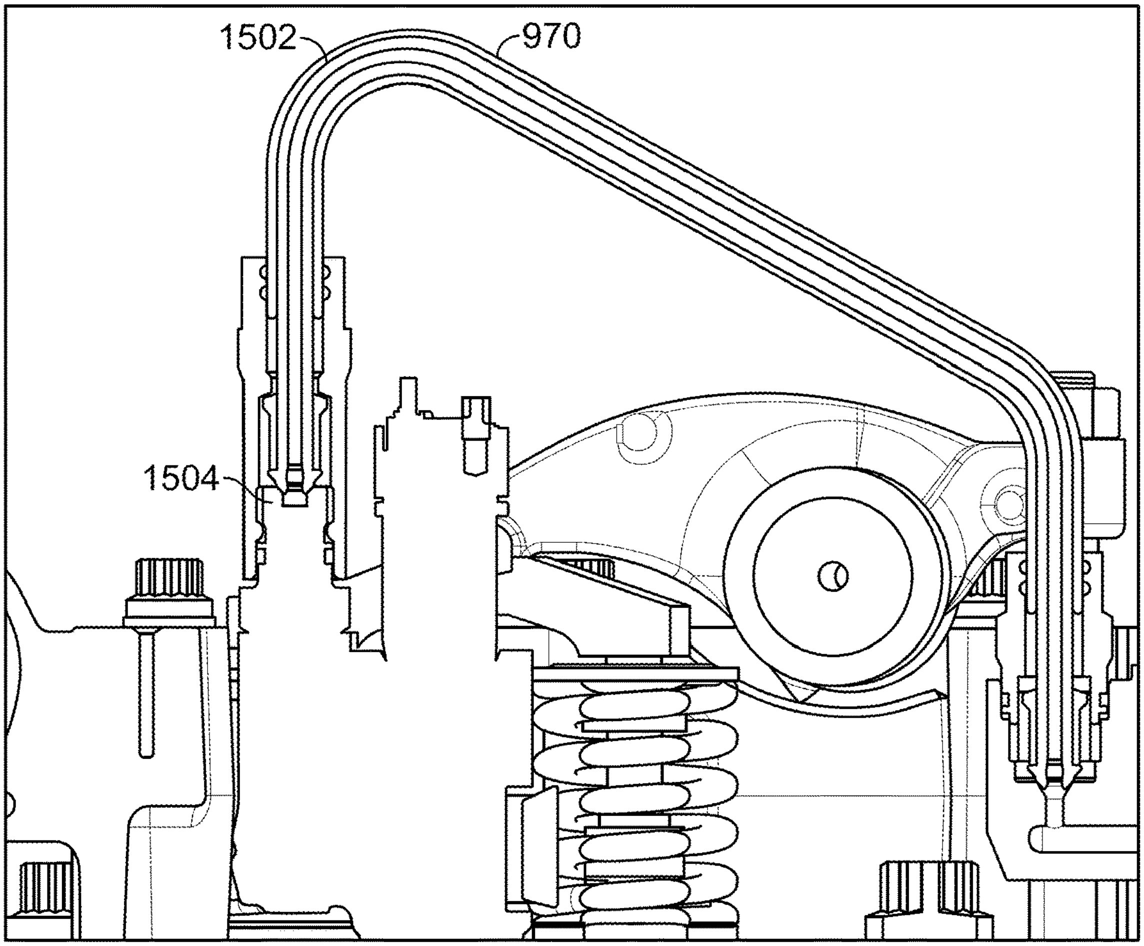
FIG. 15 is an illustration of an outer fuel line coupled to an injector joint, according to a particular embodiment.

FIG. 15 is an illustration of the first inner fuel line 970 coupled to an injector joint 1504, according to a particular embodiment. The injector joint 1504 is the location at which the first inner fuel line 970 is coupled to a fuel injector. When coupled together, fuel flows from the first inner fuel line 970 to the fuel injector such that fuel can be injected into a cylinder to provide for combustion. In some embodiments, some of the fuel from the first inner fuel line 970 does not reach the fuel injector and thus leaks from the first inner fuel line 970. A sealing component (e.g., an o-ring) prevents the leaked fuel from leaking into additional engine components such that the leaked fuel accumulates in a groove 1502. The groove 1502 is a space that is separate from the inner fuel line path 1310 and provides a path for leaked fuel to flow away from additional engine components. Accordingly, the groove 1502 serves to create a fuel line with multiple walls to provide for multiple fuel flows. The leaked fuel follows a path substantially similar to the path of the arrows as shown in FIG. 7 such that the leaked fuel fills the cavity 1312 and flows through the first leak path 1402 as described with reference to FIG. 14. In some embodiments, the outer fuel lines 930-940 and the inner fuel lines 970-980 can include multiple walls to account for fuel leakage. For example, in embodiments where more stringent safety requirements must be met (e.g., in a marine engine), the outer fuel lines 930-940 and the inner fuel lines 970-980 may include multiple walls as described such that leaking fuel may be directed away from sensitive engine components. In some arrangements, only one of the outer fuel lines 930-940 and the inner fuel lines 970-980 can include multiple walls to account for fuel leakage.

Figure 16:
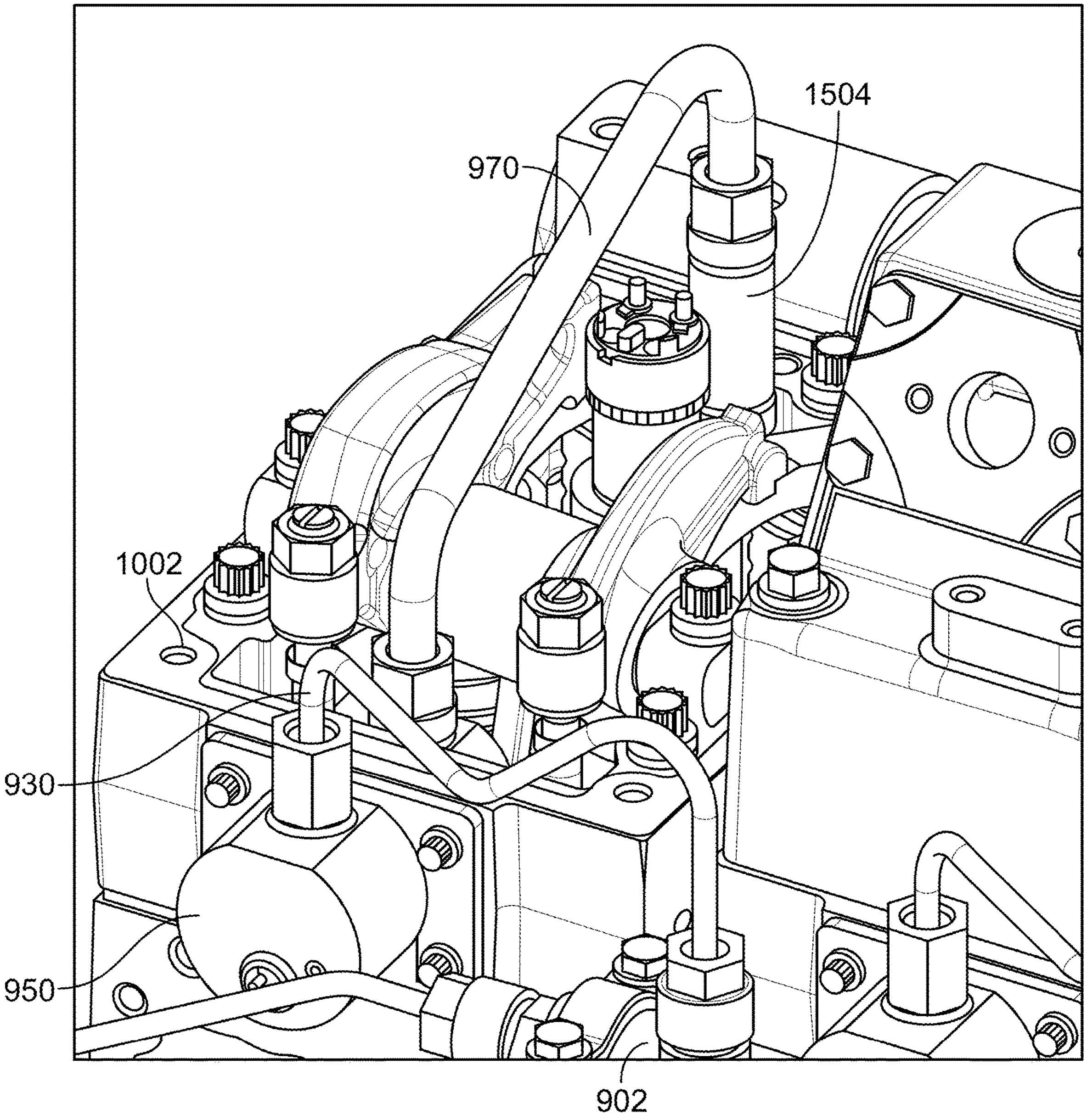
FIG. 16 is an illustration of a portion of the fuel distribution system of FIG. 9 coupled to an injector positioned under an engine valve cover (not shown).

FIG. 16 is an illustration of a portion of the fuel distribution system 900 of FIG. 9 coupled to an injector positioned under an engine valve cover (not shown). The fuel rail 902 (not shown) provides fuel to the first outer fuel line 930. The fuel flows through the first outer fuel line 930 and into the first connector block 950. The fuel flows through the first connector block 950 and into the first inner fuel line 970 such that the fuel reaches the fuel injector to be injected into the cylinder for combustion. Fuel that does not reach the fuel injector (e.g., fuel that leaks) flows back through the first inner fuel line 970 to the first connector block 950 such that the leaked fuel is directed away from the first housing 1002 via the first leak path 1402 (not shown). The leaked fuel can then be collected for further use or vented. Arrange as described, the fuel distribution system 900 serves to route fuel that leaks at the fuel injector away from the hot components of the engine, thereby avoiding the risk of fuel dripping or spraying on hot areas.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A connector block configured to direct fuel from an outer fuel line to an inner fuel line, the connector block comprising:

a single fuel inlet configured to couple to the outer fuel line;

an outlet configured to couple to the inner fuel line; and a fuel accumulator fluidly coupled to the single fuel inlet and the outlet, the fuel accumulator configured to direct the fuel from the single fuel inlet to the outlet.

2. The connector block of claim 1, wherein a diameter of the fuel accumulator is based on performance of an engine system associated with the connector block.

3. The connector block of claim 2, wherein the diameter of the fuel accumulator is between 10 millimeters and 30 millimeters.

4. The connector block of claim 2, wherein the diameter of the fuel accumulator is between 3 millimeters and 6 millimeters.

5. The connector block of claim 2, wherein the diameter of the fuel accumulator is between 6 millimeters and 10 millimeters.

6. The connector block of claim 1, wherein the connector block is manufactured from steel.

7. The connector block of claim 1, wherein the connector block is manufactured from aluminum.

8. The connector block of claim 1, further comprising a connection mechanism configured to couple the outer fuel line to the single fuel inlet.

9. The connector block of claim 8, wherein the connection mechanism is at least one of a threaded connection, a bayonet connection, or a quick release coupling.

10. The connector block of claim 1, further comprising at least one groove configured to receive and secure a sealing component.

11. The connector block of claim 10, wherein the at least one groove is located between the single fuel inlet and the outlet.

12. The connector block of claim 10, wherein the sealing component comprises an O-ring.

13. The connector block of claim 1, wherein the single fuel inlet defines an outer fuel line aperture through which the fuel can flow from the outer fuel line to the fuel accumulator.

14. The connector block of claim 1, wherein the outlet defines an inner fuel line aperture through which the fuel can flow from the fuel accumulator to the inner fuel line.

15. A connector block configured to direct fuel from an outer fuel line to an inner fuel line, the connector block comprising:

an inlet configured to couple to the outer fuel line;

an outlet configured to couple to the inner fuel line;

a fuel accumulator fluidly coupled to the inlet and the outlet, the fuel accumulator configured to direct the fuel from the inlet to the outlet; and a cavity defined by the outlet and a leak path fluidly coupled to the cavity, the cavity configured to receive leaked fuel from the inner fuel line and direct the leaked fuel to the leak path.

16. The connector block of claim 15, wherein the leak path extends in a direction substantially parallel to at least one of the inlet or the outlet.

17. The connector block of claim 15, wherein the leak path extends in a direction substantially perpendicular to at least one of the inlet or the outlet.

18. A connector block configured to direct fuel from an outer fuel line to an inner fuel line, the connector block comprising:

an inlet configured to couple to the outer fuel line;

an outlet configured to couple to the inner fuel line; and a fuel accumulator fluidly coupled to the inlet and the outlet, the fuel accumulator configured to direct the fuel from the inlet to the outlet, the fuel accumulator defining a plug aperture configured to receive a plug that forms a seal with the fuel accumulator and that is spatially separated from the inlet and the outlet.

19. The connector block of claim 18, wherein the plug aperture is positioned on an end of the connector block closest to the outlet.

20. The connector block of claim 18, wherein the plug aperture is positioned on an end of the connector block closest to the inlet.

* * * * *